(12) United States Patent
Sugiyama et al.

(10) Patent No.: US 10,533,612 B2
(45) Date of Patent: Jan. 14, 2020

(54) POWER TRANSMISSION SHAFT

(71) Applicant: HITACHI AUTOMOTIVE SYSTEMS, LTD., Hitachinaka-shi, Ibaraki (JP)

(72) Inventors: Kenichi Sugiyama, Commerce Township, MI (US); Yasutomo Mabe, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 261 days.

(21) Appl. No.: 15/634,064

(22) Filed: Jun. 27, 2017

(65) Prior Publication Data
US 2018/0010645 A1    Jan. 11, 2018

(30) Foreign Application Priority Data
Jul. 11, 2016  (JP) .................................. 2016-136506

(51) Int. Cl.
| | |
|---|---|
| *F16D 1/116* | (2006.01) |
| *F16D 1/095* | (2006.01) |
| *F16B 7/00* | (2006.01) |
| F16D 3/223 | (2011.01) |
| F16D 1/10 | (2006.01) |

(52) U.S. Cl.
CPC ................ *F16D 1/095* (2013.01); *F16B 7/00* (2013.01); *F16D 1/116* (2013.01); *F16D 3/223* (2013.01); *F16D 2001/103* (2013.01); *F16D 2003/22323* (2013.01); *F16D 2003/22326* (2013.01)

(58) Field of Classification Search
CPC .......... F16D 3/223; F16D 3/845; F16D 3/227; F16D 3/20; F16D 1/06; F16D 1/02; F16D 1/116
See application file for complete search history.

(56) References Cited

U.S. PATENT DOCUMENTS

| | | | |
|---|---|---|---|
| 7,867,099 B2 * | 1/2011 | Szentmihalyi | .......... F16D 1/108 403/342 |
| 8,647,210 B2 * | 2/2014 | Terasaka | ................. F16D 3/223 277/928 |
| 8,784,220 B1 * | 7/2014 | Katke | ..................... F16D 3/223 464/173 |

(Continued)

FOREIGN PATENT DOCUMENTS

JP    2013-194895 A    9/2013

Primary Examiner — Daniel J Wiley
(74) Attorney, Agent, or Firm — Foley & Lardner LLP

(57) ABSTRACT

A power transmission shaft comprises a shaft unit interposed between first and second shafts; an engaged portion provided on one end of the second shaft and having an annular stepped part provided between a smaller diameter portion and a larger diameter portion; and an engaging portion provided on one end of the shaft unit and joinable with the engaged portion to rotate together about a common rotation axis, wherein the engaging portion comprises a cylindrical base portion that rotates together with the shaft unit, an elastically shrinkable cylindrical portion that is provided on one axial end of the cylindrical base portion to project toward the engaged portion and catching pawls that are provided by the elastically shrinkable cylindrical portion and latchingly engageable with the annular stepped part when the engaged portion and the engaging portion are coaxially arranged and joined with each other.

20 Claims, 14 Drawing Sheets

(56) References Cited

U.S. PATENT DOCUMENTS

| | | | |
|---|---|---|---|
| 8,864,591 B2 | 10/2014 | Sugiyama et al. | |
| 2012/0004044 A1* | 1/2012 | Conger | F16D 1/116 |
| | | | 464/141 |
| 2017/0130777 A1* | 5/2017 | Oram | F16D 1/116 |
| 2019/0128333 A1* | 5/2019 | Tomogami | F16D 1/116 |

* cited by examiner

POWER TRANSMISSION SHAFT

BACKGROUND OF THE INVENTION

1. Field of the Invention

The present invention relates in general to power transmission shafts and more particularly to the power transmission shafts of a type that is applied to motor vehicles.

2. Description of Related Art

In order to clarify the present invention, one conventional power transmission shaft disclosed in Japanese Laid-open Patent Application (tokkai) 2013-194895 will be briefly described in the following.

The conventional power transmission shaft of the publication is installed between a first shaft member that is driven by an engine and a second shaft member that drives road wheels. With this, the power outputted from the engine is transmitted to the road wheels. The conventional power transmission shaft comprises a shaft unit that extends in the fore-and-aft direction of the vehicle, a first constant velocity universal joint that detachably connects a front part of the shaft unit to a rear part of the first shaft member and a second constant velocity universal joint that detachably connects a rear part of the shaft unit to a front part of the second shaft member.

Each constant velocity universal joint comprises an outer ring member provided at one end of the shaft unit, an inner ring member provided inside the outer ring member, a plurality of balls rotatably received between the outer and inner ring members to transmit a torque therebetween and an annular holding groove formed on an inner cylindrical surface of the inner ring member.

While, each of the first and second shaft members is formed at an outer cylindrical surface of an end portion thereof with an annular groove. The annular groove has a circlip resiliently installed therein.

When, for example, coupling between the first shaft member and the first constant velocity universal joint is intended, the end portion of the first shaft member is inserted into the inner ring member of the first constant velocity universal joint. During this insertion, the circlip set in the annular groove of the first shaft member is kept in touch with the cylindrical inner surface of the inner ring member of the universal joint while being compressed. When then the end portion of the first shaft member comes to a given position where the annular groove of the first shaft member is mated with the annular holding groove of the inner ring member of the universal joint, the circlip in the annular groove of the first shaft member is allowed to be resiliently expanded radially outward and thus tightly engaged with the annular holding groove of the inner ring member of the universal joint. With this, the first shaft member and the first constant velocity universal joint provided by the shaft unit are coupled with each other.

SUMMARY OF THE INVENTION

However, in the above-mentioned known coupling process, at least two operation steps are needed, one being the step for setting the circlip into the annular groove of the first shaft member and the other being the step for inserting the circlip-mounted end portion of the first shaft member to the given position in the second constant velocity universal joint where the annular groove of the first shaft member is mated with the annular holding groove of the universal joint. These two operation steps are troublesome and thus take time thereby lowering operation efficiency.

The present invention is provided by taking the above-mentioned drawback into consideration and aims to provide a power transmission shaft that can be easily coupled with the first or second shaft member.

In accordance with the present invention, there is provided a power transmission shaft interposed between first and second shaft members (1, 2) that constitute a pair of vehicle side shaft members (1, 2), the first shaft member (1) being arranged to be driven by a power source and the second shaft member (2) being arranged to drive road wheels, so that a power of the power source is transmitted to the road wheels through the power transmission shaft, the power transmission shaft comprising a shaft unit (3) interposed between the first shaft member (1) and the second shaft member (2); an engaged portion (9, 10, 11, 12) that is provided on one axial end of one of the paired vehicle side shaft members (1, 2) and has an annular stepped part (15b, 16) formed between a smaller diameter portion (16) with a first diameter and a larger diameter portion (15) with a second diameter larger than the first diameter, each of the smaller and larger diameter portions being arranged to extend around a common rotation axis (L1); an engaging portion (31, 32, 33) that is provided on one axial end of the shaft unit (3), wherein the engaging portion (31, 32, 33) comprises a cylindrical base portion (31) that rotates together with the shaft unit (3), an elastically shrinkable cylindrical portion (32) that is provided by the cylindrical base portion (31) at a position opposite to the shaft unit (3), and a projected portion (33) that is provided by the elastically shrinkable cylindrical portion (32) and latchingly engageable with the annular stepped part (15b, 16).

BRIEF DESCRIPTION OF THE DRAWINGS

Other objects and advantages of the present invention will be apparent from the following description when taken in conjunction of the accompanying drawings, in which.

DETAILED DESCRIPTION OF THE INVENTION

In the following, four embodiments 100, 200, 300 and 400 of the power transmission shaft of the present invention will be described in detail with reference to the accompanying drawings.

In the following description, various directional terms, such as right, left, upper, lower, rightward and the like are used for ease of explanation. It is however to be noted that such terms are to be understood with respect to only a drawing or drawings on which a corresponding element or portion is shown.

First Embodiment

Figure 1:
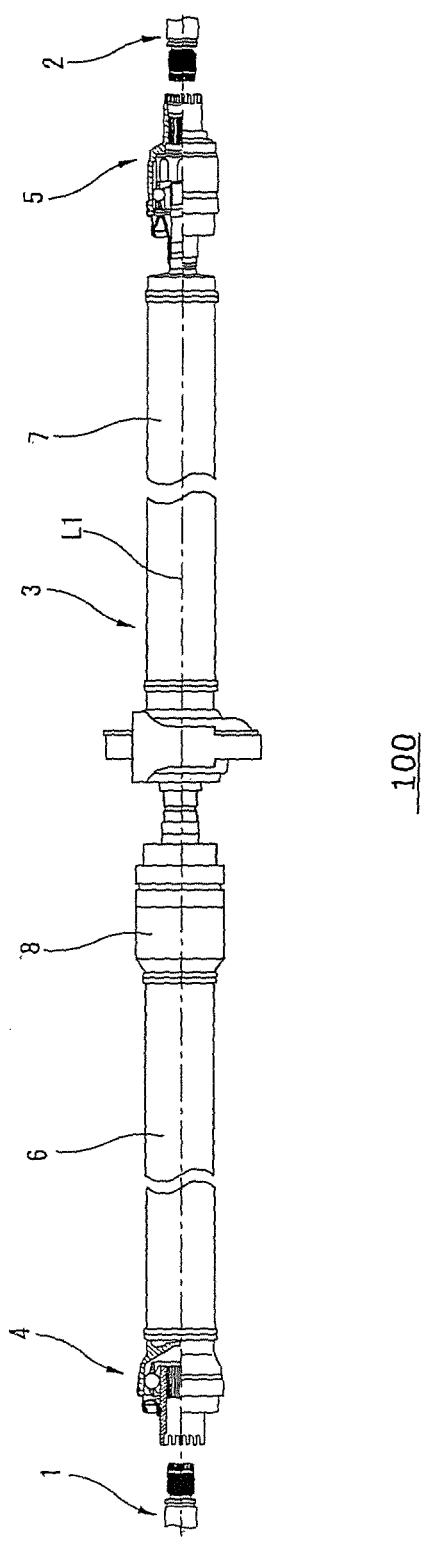
FIG. 1 is a side view of a propeller shaft of a first embodiment of the present invention with some parts removed.

Referring to FIG. 1, there is shown a propeller shaft of a motor vehicle, which has the power transmission shaft of a first embodiment 100 of the present invention. The propeller shaft is a device for transmitting an engine power to drive road wheels of the motor vehicle.

As shown in FIG. 1, the propeller shaft is arranged between an input shaft 1 whose left end (not shown) is connected to an output member of a transmission and an output shaft 2 whose right end (not shown) is connected to a differential gear. As is known, the transmission receives an engine power from an engine and the differential gear provides the road wheels with the engine power.

For ease of explanation, the input shaft 1 may be sometimes called as "a first shaft portion of vehicle-side rotation member" and the output shaft 2 may be sometimes called as "a second shaft portion of vehicle-side rotation member" in the following description.

As shown, the propeller shaft comprises a shaft unit 3 that is coaxially arranged with the input and output shafts 1 and 2, a first constant velocity universal joint 4 that is installed to an input end (left end) of the shaft unit 3 and connected to an output end (right end) of the input shaft 1 to provide integral rotation therebetween, a second constant velocity universal joint 5 that is installed to an output end (right end) of the shaft unit 3 and connected to an input end (left end) of the output shaft 2 to provide integral rotation therebetween.

It is to be noted that the input shaft 1, the output shaft 2 and the shaft unit 3 rotate together about a common rotation axis L1.

The shaft unit 3 comprises a drive shaft 6 of iron-based alloy that is connected to the input shaft 1 through the first constant velocity universal joint 4, a driven shaft 7 of iron-based alloy that is connected to the output shaft 2 through the second constant velocity universal joint 5, and a third constant velocity universal joint 8 that is operatively interposed between the drive and driven shafts 6 and 7, as shown. Due to usage of the drive and driven shafts 6 and 7 and the third constant velocity universal joint 8, the shaft unit 3 has a split structure.

In the following, the structure of the output end (right end) of the input shaft 1 and the structure of the input end (left end) of the output shaft 2 will be described. Since these two structures are substantially the same in construction, the following description will be directed to only the input end (left end) of the output shaft 2 for simplification of the description.

Figure 2:
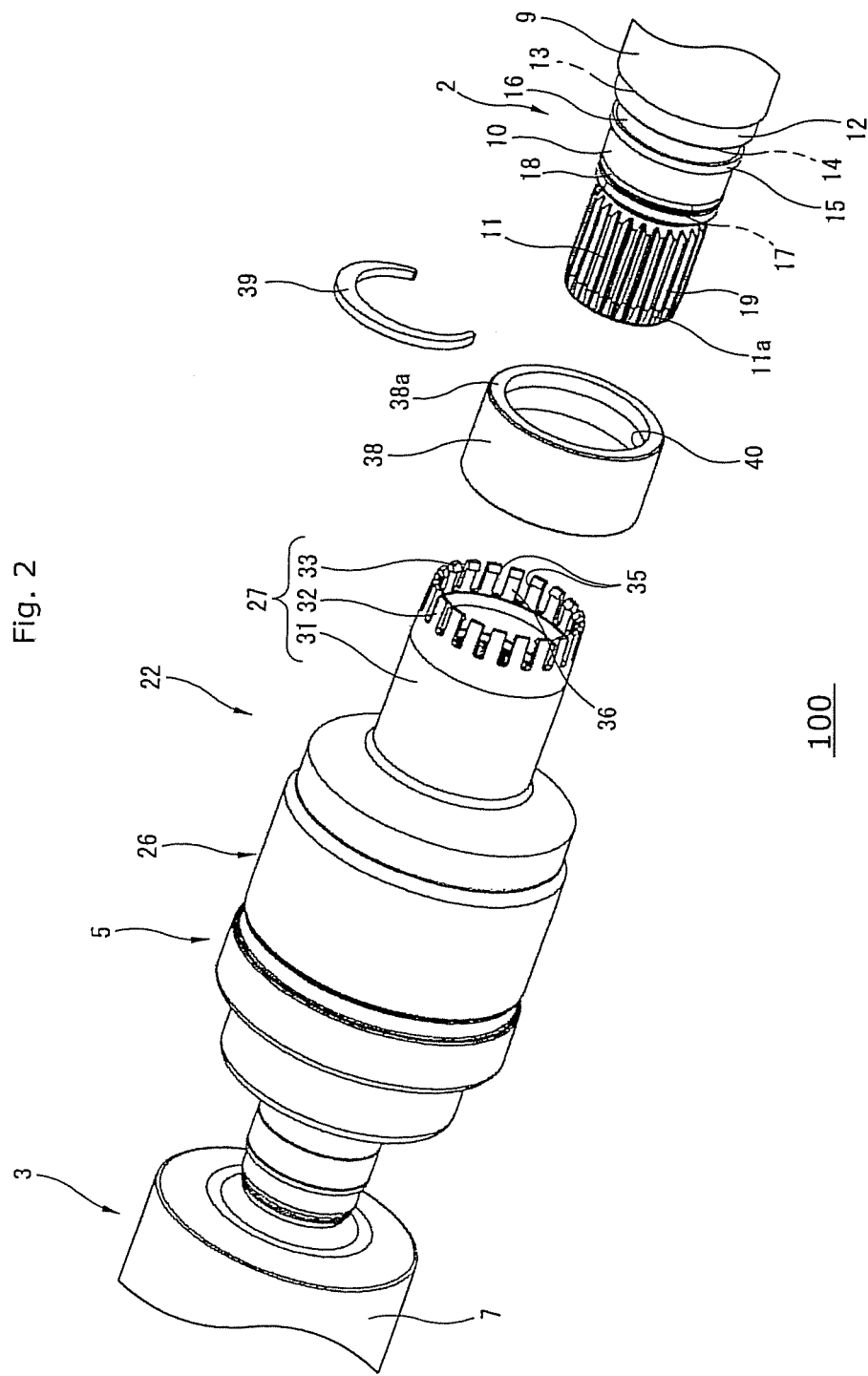
FIG. 2 is an exploded perspective view of a unit that is an essential part of the first embodiment and includes a second constant velocity universal joint and an output shaft.
Figure 3:
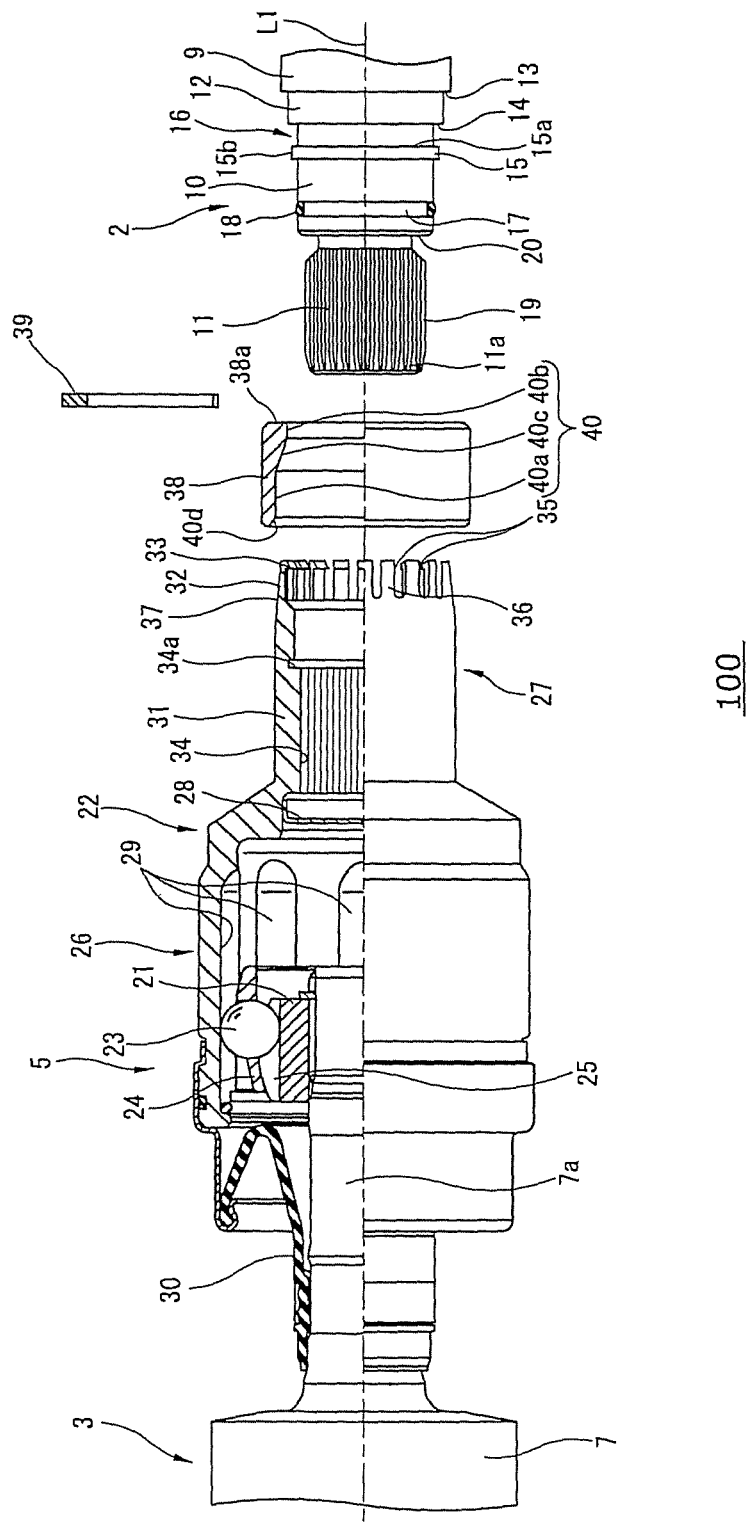
FIG. 3 is a sectional view of the unit of FIG. 2 in a condition in which the output shaft is about to be inserted into the second constant velocity universal joint.

As is well shown in FIGS. 2 and 3, the input end (left end) of the output shaft 2 has a stepped cylindrical structure including a larger diameter portion 9 that extends toward the differential gear (not shown), a smaller diameter portion 11 that extends toward the shaft unit 3 and a medium diameter portion 10 that is arranged between the larger and smaller diameter portions 9 and 11.

The medium diameter portion 10 is formed with an annular projection 12 at a position where an outer cylindrical surface of the medium diameter portion 10 adjoins the larger diameter portion 9. As is seen from FIG. 3, an outer diameter of the annular projection 12 is slightly smaller than that of the larger diameter portion 9, and thus as is seen from the same drawing, there is defined a first circular step surface 13 between the annular projection 12 and the larger diameter portion 9 and there is defined a second circular step surface 14 between the annular projection 12 and the medium diameter portion 10.

As is seen from FIG. 3, the medium diameter portion 10 is further formed with an annular flange portion 15 at a position separated from the annular projection 12, to which after-mentioned catching pawls 33 of the second constant velocity universal joint 5 are engaged. As is seen from FIGS. 2 and 3, the annular flange portion 15 is integrally formed on a cylindrical outer surface of the medium diameter portion 10 and has a substantially rectangular cross section. As is seen from FIG. 3, an annular groove 16 is defined by a right side surface 15a of the annular flange portion 15, the second circular step surface 14 and part of the cylindrical surface of the medium diameter portion 10.

As is seen from FIGS. 2 and 3, the medium diameter portion 10 is formed with an annular coupling groove 17 at a position near the smaller diameter portion 11. A seal ring 18 of synthetic rubber is resiliently put in the annular coupling groove 17.

As shown, the smaller diameter portion 11 is formed with a male serration 19 that extends axially, and a leading end (left end) 11a of the smaller diameter portion 11 is tapered.

As is seen from FIG. 3, at a portion between the medium and smaller diameter portions 10 and 11, there is formed an annular groove whose right wall constitutes an annular abutting surface 20.

Figure 4:
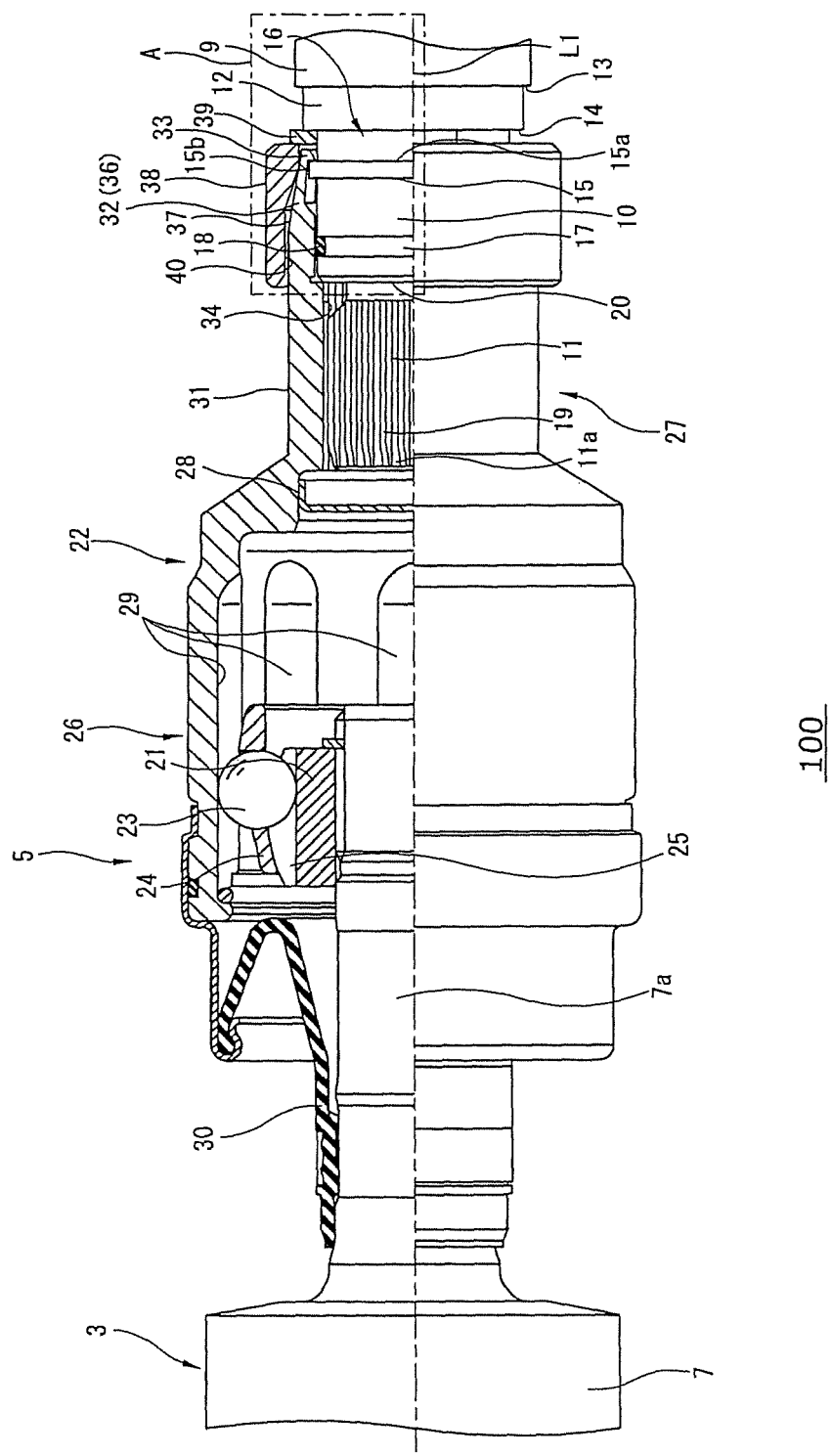
FIG. 4 is a sectional view of the unit of FIG. 2 in a condition in which the output shaft is properly joined or coupled with the second constant velocity universal joint.

As is seen from FIGS. 3 and 4, the second constant velocity universal joint 5 is of an outer ring fixed type in which the output shaft 2 is connected to after-mentioned outer ring member 22. The joint 5 generally comprises an inner ring member 21 connected to the driven shaft 7, an outer ring member 22 arranged around the inner ring member 21, a plurality of balls 23 rotatably received between the inner and outer ring members 21 and 22 and a cylindrical cage 24 rotatably holding the balls 23.

The inner ring member 21 is made of iron-based metal and shaped cylindrical. A stub shaft 7a of the driven shaft 7 is inserted into the inner ring member 21 to make a spline coupling with the same, so that the driven shaft 7 and the inner ring member 21 rotate like a single unit.

The inner ring member 21 has an outer cylindrical surface curved into an arc-shape and has a plurality of engaging grooves 25 that are arranged at evenly spaced intervals in a circumferential direction and extend axially. Each engaging groove 25 has an arc-shaped cross section and is engageable with part of the corresponding ball 23.

The outer ring member 22 is made of iron-based metal and formed into a stepped cylindrical shape. As is seen from the drawings, the outer ring member 22 comprises a larger diameter portion 26 that axially faces the shaft unit 3 and encloses therein the inner ring member 21 to establish a synchronized rotation with the inner ring member 21 and a smaller diameter portion 27 to which the output shaft 2 is connected. As is best seen from FIG. 4, an inner space of the larger diameter portion 26 and that of the smaller diameter portion 27 are isolated by a seal cap 28.

The larger diameter portion 26 has a cylindrical inner space that is sized to freely receive therein the inner ring member 21 and has on its cylindrical inner surface a plurality of engaging grooves 29 that respectively face the engaging grooves 25 of the inner ring member 21. Like the engaging grooves 25, each engaging groove 29 has an arc-shaped cross section and is engageable with part of the corresponding ball 23. The balls 23 are respectively and rotatably received between the engaging grooves 29 of the outer ring member 22 and the engaging grooves 25 of the inner ring member 21, so that the inner ring member 21 and the outer ring member 22 are rotated synchronously.

The length of each engaging groove 29 of the outer ring member 22 is longer than that of each engaging groove 25 of the inner ring member 21, so that a certain axial displacement between the shaft unit 3 and the outer ring member 22 is allowed.

As is seen from FIGS. 3 and 4, between an outer surface of the outer ring member 22 and an outer surface of the stub shaft 7a, there extends a boot member 30 for protecting inner parts of the second constant velocity universal joint 5 from foreign substances. That is, due to employment of the boot member 30, a circular space defined between the stub shaft 7a and the outer ring member 22 is closed.

As is seen from FIGS. 3 and 4, the smaller diameter portion 27 of the outer ring member 22 comprises a cylindrical base portion 31 that extends rightward from the larger diameter portion 26, a plurality of circularly arranged and resiliently flexible arms 32 that extend rightward from the cylindrical base portion 31 while forming a cylindrical shape by the arms 32, and a plurality of engaging pawls 33 that are respectively formed on leading ends of the flexible arms 32. As is seen from FIG. 2, a plurality of slits 35 are formed for defining the flexible arms 32.

As is seen from FIG. 3, the cylindrical base portion 31 is formed, at its inner cylindrical surface, with a female serration 34 that extends axially and is engageable with the male serration 19 of the output shaft 2.

At a right end of the female serration 34, there is formed a stopper surface 34a against which the above-mentioned annular abutting surface 20 of the output shaft 2 abuts for establishing a relative axial positioning between the outer ring member 22 and the output shaft 2.

Figure 5:
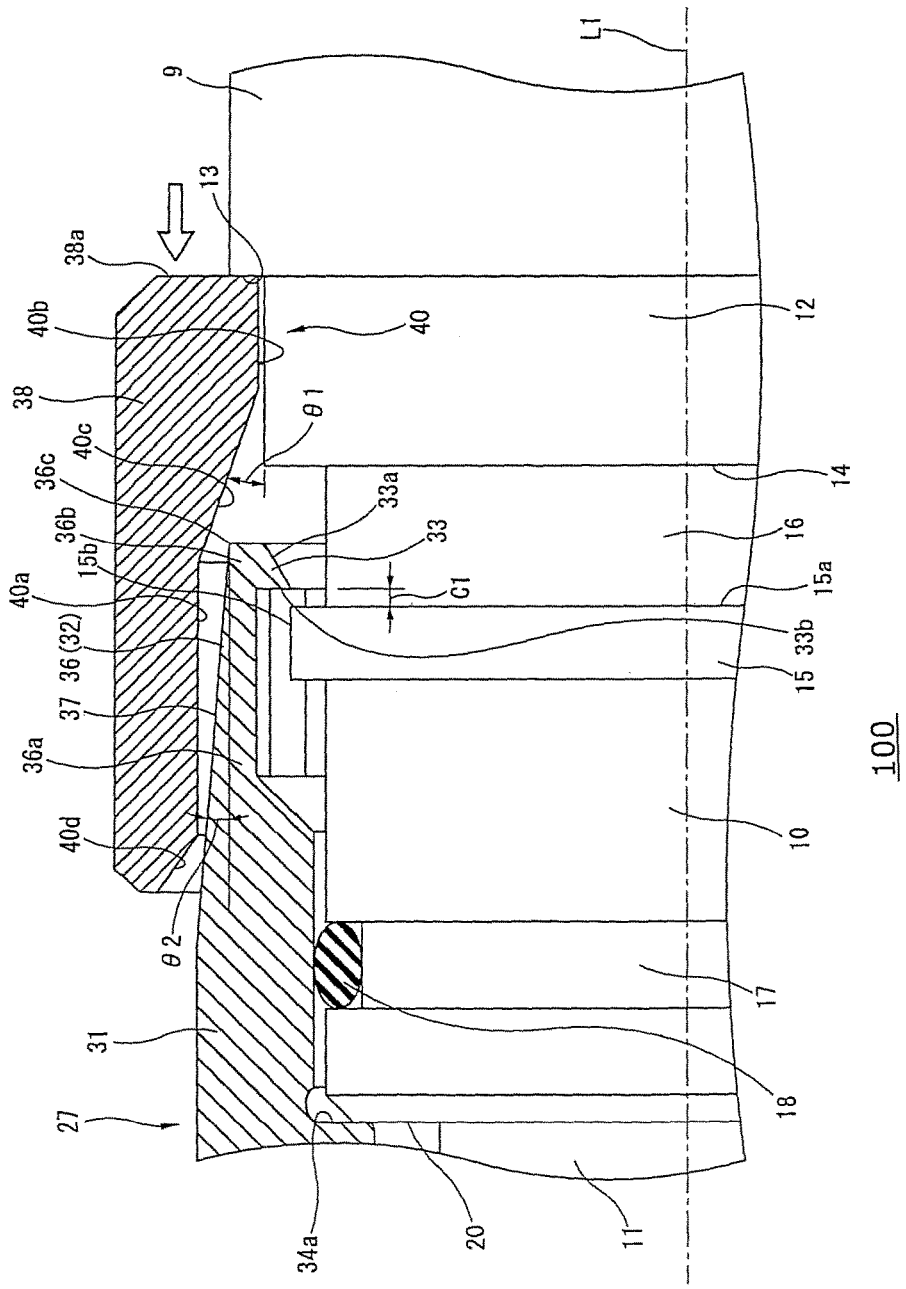
FIG. 5 is an enlarged sectional view of the portion indicated by "A" in FIG. 4 in a condition in which a fixing ring member and a circlip are not assembled yet.
Figure 6:
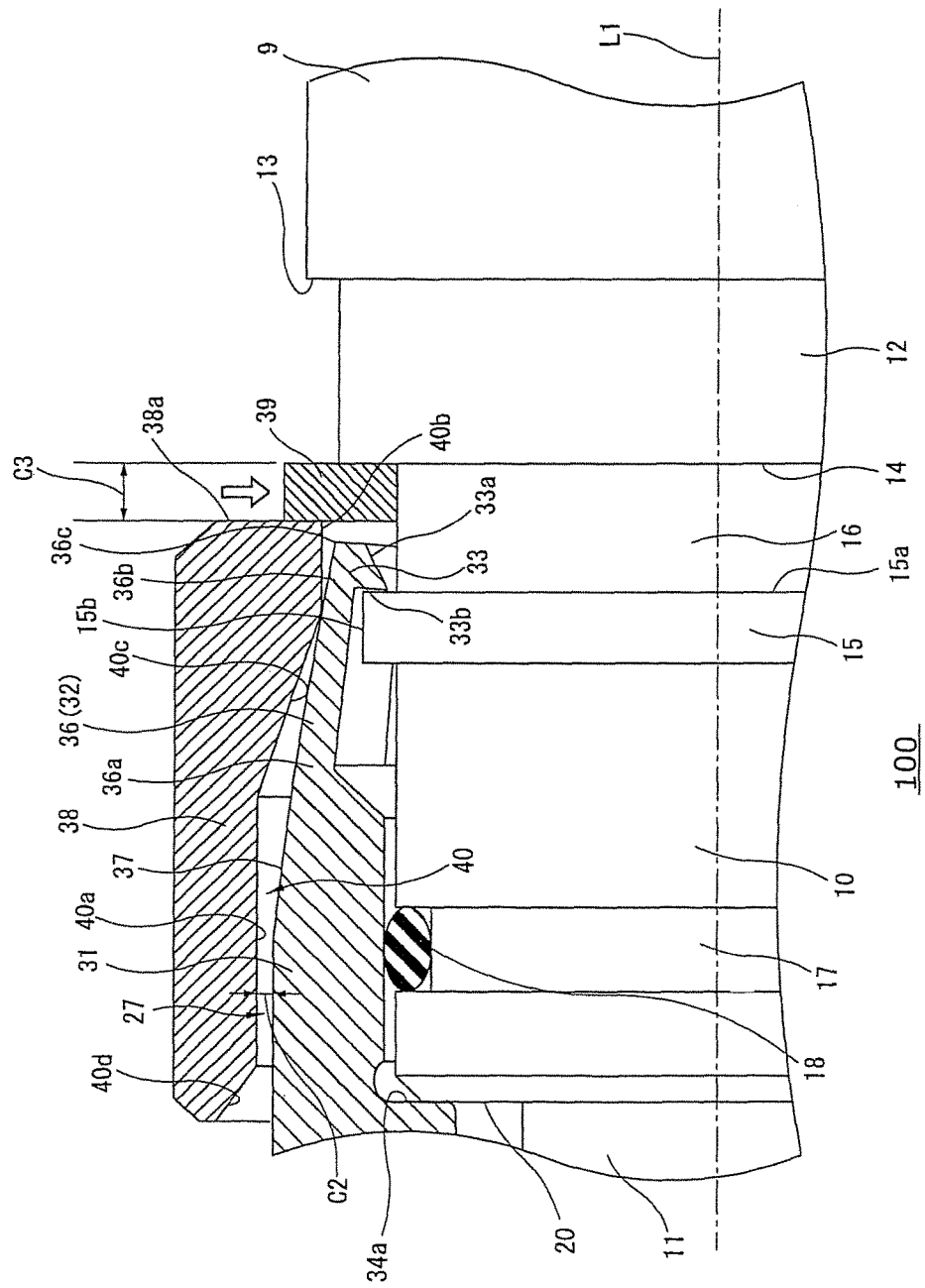
FIG. 6 is a sectional view similar to FIG. 5, but showing a condition in which the fixing ring member and the circlip are properly assembled.

As is seen from FIGS. 5 and 6, the stopper surface 34a is shaped annular to effectively receive the annular abutting surface 20. That is, as is seen from FIG. 3, when the smaller diameter portion 11 of the output shaft 2 is inserted into the smaller diameter portion 27 of the outer ring member 22, the inserting movement of the output shaft 2 is stopped at a position where the annular abutting surface 20 abuts against the annular stopper surface 34a.

In the following, a condition in which, after deep insertion of the output shaft 2 into the smaller diameter portion 27 of the outer ring member 22, the annular abutting surface 20 abuts against the annular stopper surface 34a will be called as just "abutted condition".

As will be understood from FIGS. 4 to 6, particularly FIG. 4, under the "abutted condition", the seal ring 18 in the annular coupling groove 17 of the medium diameter portion 10 resiliently abuts against the cylindrical inner surface of the female serration 34 of the cylindrical base portion 31.

As is seen from FIG. 2, each flexible arm 32 is provided with a flat flexible part 36 that extends axially.

The thickness of the flat flexible part 36 is smaller than that of the cylindrical base portion 31. Since the outer ring member 22 is made of a resilient metal, the flexible arms 32 can exhibit a satisfied elastical deformation. Thus, as is seen from FIGS. 5 and 6, each flexible arm 32 can be resiliently flexed using a base part 36a thereof as a fulcrum.

As is seen from FIG. 5, in a given range from the cylindrical base portion 31 of the smaller diameter portion 27 to leading ends of the flexible arms 32, there is formed a tapered surface 37. That is, the tapered surface 37 is inclined relative to the common rotation axis L1 in such a manner that a radial distance therebetween is gradually reduced as the slope is shifted rightward in FIG. 5. As is seen from this drawing, with such inclination, the thickness of the given range is gradually reduced.

As is seen from FIGS. 5 and 6, each catching pawl 33 is projected rightward from the leading end of the corresponding flat flexible part 36, and comprises an inclined surface 33a that inclines relative to the common rotation axis L1 in such a manner that a radial distance therebetween is gradually increased as the slope is shifted rightward in FIG. 5, and an engaging surface 33b that extends radially outward from a left end of the inclined surface 33a to the leading end of the flat flexible part 36.

As will be understood from FIGS. 3 and 5, when the output shaft 2 is being inserted into the smaller diameter portion 27 of the outer ring member 22, the base parts 36a of the flexible arms 32 partially contact an outer cylindrical wall 15b of the annular flange portion 15 or don't contact the outer cylindrical wall 15b.

When the output shaft 2 is under the above-mentioned "abutted condition", the engaging surface 33b of each catching pawl 33 and a right surface 15a (in FIG. 5) of the annular flange portion 15 define therebetween a given clearance C1.

As is understood from FIGS. 2 to 6, to the smaller diameter portion 27 of the outer ring member 22, there are connected a fixing ring member 38 and a circlip 39. The fixing ring member 38 is press-fitted to the outer cylindrical surface of the smaller diameter portion 27. During the press-fitting of the fixing ring member 38, the flexible arms 32 are radially inwardly compressed causing the engaging pawls 33 to engage with the annular flange portion 15, and once the press-fitting is completed, the engaged condition of the engaging pawls 33 to the annular flange portion 15 is kept. The circlip 39 functions to hold the fixing ring member 38 at the press-fitted position, that is, to suppress disengagement of the fixing ring member 38 from the smaller diameter portion 27.

As is seen from FIG. 2, the fixing ring member 38 is a metal ring with a through hole 40. The fixing ring member 38 is loosely mounted on the left end portion of the output shaft 2 before being tightly and properly mounted on the smaller diameter portion 27. This mounting manner will be well understood from FIG. 5.

As is seen from FIGS. 3 to 6, the through hole 40 of the fixing ring member 38 comprises a larger diameter portion 40a that faces the smaller diameter portion 27 of the outer ring member 22, a smaller diameter portion 40b that faces the output shaft 2 and a tapered middle portion 40c that extends between the larger and smaller diameter portions 40a and 40b.

The diameter of the larger diameter portion 40a is slightly larger than the outer diameter of the cylindrical base portion 31 of the outer ring member 22, so that, as is seen from FIG. 6, when the fixing ring member 38 is properly fixed to the smaller diameter portion 27 of the outer ring member 22, there is formed an annular clearance C2 between a cylindrical wall of the larger diameter portion 40a and the outer cylindrical surface of the cylindrical base portion 31 of the outer ring member 22.

As is seen from FIG. 6, the left end of the larger diameter portion 40a is formed with a tapered guide surface 40d through which insertion of the flexible arms 32 into the through hole 40 of the fixing ring member 38 is smoothly made.

The diameter of the smaller diameter portion 40b is larger than the outer diameter of the annular projection 12 of the output shaft 2 and smaller than the outer diameter of the larger diameter portion 9 of the output shaft 2. Thus, when, as is seen from FIG. 5, the fixing ring member 38 is in a standby position for being fixed to the smaller diameter portion 27 of the outer ring member 22, a right end surface 38a of the fixing ring member 38 contacts with the circular step surface 13 of the larger diameter portion 9 of the output shaft 2, so that a further rightward movement of the fixing ring member 38 is suppressed.

As is seen from FIG. 5, the tapered middle portion 40c of the through hole 40 is so shaped that an angle θ1 thereof relative to the common rotation angle L1 is made larger than an angle θ2 of the tapered surface 37 of the smaller diameter portion 27 relative to the common rotation angle L1.

Accordingly, when the fixing ring member 38 is axially press-fitted to the smaller diameter portion 27, the tapered middle portion 40c is forced to abut against leading edges 36c of the flat flexible parts 36 of the flexible arms 32 and then slide along the tapered surfaces 37 of the flexible arms 32. During this, the catching pawls 33 of the flexible arms 32 are resiliently flexed inward. That is, by a so-called wedge effect produced when the tapered middle portion 40c is moved leftward in FIG. 5, the catching pawls 33 are flexed radially inward.

As is seen from FIG. 2, the circlip 39 is made of an elastic metal and shaped into "C". That is, arm portions of the circlip 39 are resiliently deformable in radially outward and inward directions.

As will be understood from FIG. 6, only when the fixing ring member 38 is properly press-fitted to the smaller diameter portion 27 of the outer ring member 22 causing the catching pawls 33 to engage with the annular flange portion 15, the circlip 39 can be properly set or put in a clearance C3 defined between the right end surface 38a of the fixing ring member 38 and the second circular step surface 14 or the output shaft 2. The axial length of the clearance C3 is substantially the same as the thickness of the circlip 39. Under this condition, due to a latching function of the circlip 39, the press-fitted state of the fixing ring member 38 to the smaller diameter portion 27 of the outer ring member 22 is latched. As will become apparent as the description proceeds, under this condition, the male serration 19 of the output shaft 2 is properly engaged with the female serration 34 of the cylindrical base portion 31, as will be understood from FIG. 4.

Figure 7:
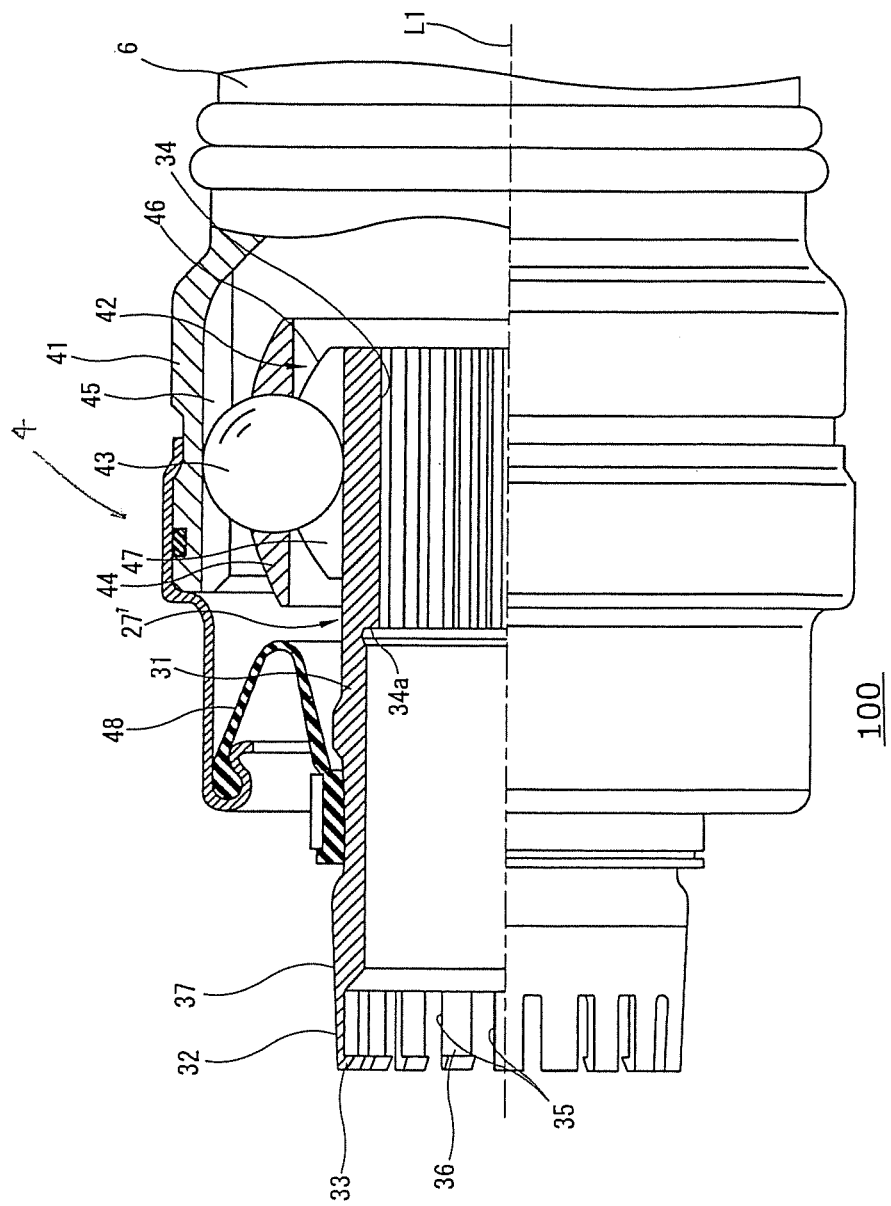
FIG. 7 is an enlarged sectional view of a part of a first constant velocity universal joint employed in the first embodiment of the present invention.

As is seen from FIGS. 1 and 7, the first constant velocity universal joint 4 is of an inner ring fixed type that has an after-mentioned inner ring member 42 to which the input shaft 1 is connected. That is, the universal joint 4 generally comprises an outer ring member 41 that is connected to the drive shaft 6 to make an integral rotation therebetween, an inner ring member 42 that is installed inside the outer ring member 41, a plurality of balls 43 that are rotatably received between the outer and inner ring members 41 and 42 and a cylindrical cage 44 that rotatably holds the balls 43.

The outer ring member 41 is made of iron-based metal and has, on its inner cylindrical surface, outer ring side engaging grooves 45 that are substantially the same as the engaging grooves 25 of the above-mentioned second constant velocity universal joint 5. Like the engaging grooves 25, the engaging grooves 45 extend axially.

The inner ring member 42 is made of iron-based metal and comprises an inner ring portion 46 that is synchronously rotated with the outer ring member 41 and a tubular shaft portion 27' that is integrally provided inside the inner ring portion 46 and projects in a direction away from the shaft unit 3 (see FIG. 1).

The inner ring portion 46 has, on its outer cylindrical surface, inner ring side engaging grooves 47 that face the outer ring side engaging grooves 45 of the outer ring member 41 and are substantially the same as the engaging grooves 25 of the second constant velocity universal joint 5. Like the engaging grooves 25, the engaging grooves 47 extend axially. It is to be noted that the balls 43 are rotatably received between the engaging grooves 45 and the engaging grooves 47. With this arrangement, the outer ring member 41 and the inner ring member 42 can be synchronously rotated like the second constant velocity universal joint 5.

As is apparent when FIG. 7 is compared with FIG. 4 where the second constant velocity universal joint 5 is shown, the tubular shaft portion 27' (see FIG. 7) of the first constant velocity universal joint 4 is similar to the inner ring member 21 of the second constant velocity universal joint 5 except that the tubular shaft portion 27' of the first constant velocity universal joint 4 has the leftward extending cylindrical portion 31 to which a boot member 38 is attached. Although not shown in FIG. 7, for connecting the first constant velocity universal joint 4 to the input shaft 1 (see FIG. 1), a fixing ring member corresponding to the above-mentioned fixing ring member 38 and a circlip corresponding to the above-mentioned circlip 39 are employed.

In the following, a method for assembling the above-mentioned propeller shaft will be briefly described with the aid of the drawings, particularly FIGS. 1, 5 and 6.

As is seen from FIGS. 1 and 5, when it is intended to join the output shaft 2 to the second constant velocity universal joint 5, the fixing ring member 38 loosely disposed on the annular projection 12 of the medium diameter portion 10 of the output shaft 2. Then, the left end part of the output shaft 2 is strongly inserted into the smaller diameter portion 27 of the second constant velocity universal joint 5. Upon this, the annular abutting surface 20 of the output shaft 2 abuts against the annular stopper surface 34a of the smaller diameter portion 27 thereby to establish the abutted condition.

Then, the fixing ring member 38 is strongly slid leftward over the right portion of the smaller diameter portion 27.

During this leftward movement of the fixing ring member 38, the tapered middle portion 40c of the through hole 40 of the fixing ring member 38 is brought into abutment with the leading edges 36c of the flexible arms 32 of the smaller diameter portion 27 to resiliently press or flex the leading edges 36c radially inward.

When the fixing ring member 38 is moved to a given position where the fixing ring member 38 is properly press-fitted to the outer cylindrical surface of the smaller diameter portion 27, the engaging pawls 33 of the flexible arms 32 become engaged with the annular flange portion 15 of the output shaft 2 as is seen from FIG. 6.

Then, as is seen from FIG. 6, the circlip 39 is press-fitted to the clearance C3 defined between the right end surface 38a of the fixing ring member 38 and the second circular step surface 14 of the output shaft 2. Upon this, a latched connection between the output shaft 2 and the second constant velocity universal joint 5 is established.

In the following, various advantages possessed by the first embodiment of the present invention will be described.

As is mentioned hereinabove, in the present invention, after the left end part of the output shaft 2 is inserted into the smaller diameter portion 27, the fixing ring member 38 is press-fitted to the smaller diameter portion 27, and then, the circlip 39 is fitted to the given clearance C3. It is to be noted that these assembling steps are very easy to workers and thus, working efficiency is very increased.

Because the inward flexing of the flexible arms 32 is made by the fixing ring member 38, the engagement between the annular flange portion 15 and the catching pawls 33 can be assuredly made for a long time.

Due to usage of the circlip 39, the press-fitted state of the fixing ring member 38 to the smaller diameter portion 27 is latched, and thus, undesired disengagement of the fixing ring member 38 from the smaller diameter portion 27 is assuredly suppressed.

In the present invention, the engagement between the catching pawls 33 and the annular flange portion 15 is made by flexing the flexible arms 32 without exceeding the elastic limit of the arms 32. Accordingly, when it is intended to disconnect the output shaft 2 from the smaller diameter portion 27 for performing maintenance or the like, it is only necessary to cancel or remove the press-fitted state of the fixing ring member 38 relative to the smaller diameter portion 27. Upon this cancelling, the flexible arms 32 can be flexed radially outward by their remaining own elasticity releasing the catching pawls 33 thereof from the annular flange portion 15. Thus, there is no need of preparing a special concrete step for releasing the catching pawls 33 from the annular flange portion 15. In other words, the working efficiency is very increased.

As is seen from FIGS. 2 and 6, when the output shaft 2 is properly joined to the smaller diameter portion 27, the seal ring 18 is placed between the male serration 19 and the medium diameter portion 10, the male and female serrations 19 and 34 can be prevented from intrusion of rainwater. Thus, undesired rusting of the male and female serrations 19 and 34 can be prevented. As is known, once such rusting is produced, the torque transmission function of the serrations 19 and 34 is very lowered.

Since the part of the smaller diameter portion 27 to which the seal ring 18 resiliently abuts is an inner cylindrical surface of the cylindrical base portion 31 where the shape change caused by the above-mentioned assembling steps is hardly produced, the sealing property of the seal ring 18 is elongated.

Furthermore, in the first embodiment, the part of the smaller diameter portion 27 to which the seal ring 18 resilient abuts is sufficiently remote from the flexible arms 32 that are largely flexed during the above-mentioned assembling steps, and thus, the sealing characteristic of the seal ring 18 can be effectively elongated.

Furthermore, in the first embodiment, due to provision of the slits 35 that extend axially, the flexibility of the flexible arms 32 at the time when the flexible arms 32 are flexed radially inward is increased. Thus, the engagement between the catching pawls 33 and the annular flange portion 15 is easily achieved.

Furthermore, in the first embodiment, the thickness of the flat flexible part 36 is smaller than that of the cylindrical base portion 31, and thus, a sufficient flexibility of each flexible arm 32 is obtained.

Furthermore, in the first embodiment, due to provision of the tapered surface 37 by which the thickness of each flexible arm 32 is gradually reduced from its base part 36a to its leading end 36b, it is possible to provide a base part of the flexible arm 32 with a satisfied fixing strength. Due to the gradually reducing thickness of the flexible arm 32, undesired stress concentration is not applied to the flexible arm 32, and thus, the mechanical strength of the flexible arm 32 is held for a long time.

Due to the desired flexibility of the flexible arms 32, the cylindrical base portion 31 is hardly affected by the stress applied to the flexible arms 32, and thus, the sealing effect of the seal ring 18 is assuredly obtained.

Due to a so-called wedge effect applied to the flexible arms 32 from the fixing ring member 38, the flexible arms 32 are radially inwardly flexed to cause the engagement of the engaging pawls 33 with the annular flange portion 15. That is, the engagement of the engaging pawls 33 to the annular flange portion 15 is achieved by only moving the fixing ring member 38 in one axial direction.

In the first embodiment, the angle θ1 of the tapered middle portion 40c relative to the common rotation angle L1 is made larger than the angle θ2 of the tapered surface 37 of the smaller diameter portion 27 relative to the common rotation angle L1. Thus, the engagement of the engaging pawls 33 to the annular flange portion 15 is assuredly made prior to the engagement of the base part 36a of each flexible arm 32 with the tapered middle portion 40c. That is, prior to the engagement of the base parts 36a of the flexible arms 32 with the tapered middle portion 40c, the tapered middle portion 40c of the fixing ring member 38 is brought into abutment with the leading edges 36c of the flexible arms 32 thereby to flex the flexible arms 32 radially inwardly for the assured engagement between the catching pawls 33 and the annular flange portion 15.

In this embodiment, for locking the fixing ring member 38, the circlip 39 is used. That is, for locking the fixing ring member 38, the circlip 39 is simply put into the annular groove 16 of the output shaft 2.

Furthermore, as is seen from FIG. 6, due to formation of the annular clearance C2 between the cylindrical wall of the larger diameter portion 40a and the outer cylindrical surface of the cylindrical base portion 31 of the outer ring member 22, the movement of the fixing ring member 38 to the desired locking portion over the outer ring member 22 is easily made without being interrupted by the outer ring member 22. That is, due to provision of the annular clearance C2, undesired inclination of the fixing ring member 38 is absorbed. Even if the fixing ring member 38 is loosely engaged with the outer ring member 22, such loosed engagement can be easily corrected by the circlip 39.

As is seen from FIGS. 5 and 6, when the fixing ring member 38 is moved to its locking position of FIG. 6, the engagement between the catching pawls 33 and the annular flange portion 15 can't be viewed from the outside because the fixing ring member 38 covers or conceals such parts 33 and 15. However, in the first embodiment, the proper setting of the circlip 39 in the clearance C3 proves that the catching pawls 33 have been sufficiently engaged with the annular flange portion 15.

Under the above-mentioned "abutted condition" wherein the annular abutting surface 20 abuts against the annular stopper surface 34a, the engaging surface 33b of each catching pawl 33 and the right surface 15a (in FIG. 5) of the annular flange portion 15 define therebetween the given clearance C1. Due to provision of the given clearance C1, undesired phenomenon wherein, when the flexible arms 32 are flexed radially inward by the tapered middle portion 40c of the fixing ring member 38, the catching pawls 33 ride on the outer cylindrical wall 15b of the annular flange portion 15 is suppressed.

Although, in the above description, the explanation is directed to advantageous effects that are given by the connection between the output shaft 2 and the smaller diameter portion 27 of the second constant velocity universal joint 5, similar advantageous effects are also given by the connection between the input shaft 1 and the smaller diameter portion 27 of the first constant velocity universal joint 4.

Second Embodiment

Figure 8:
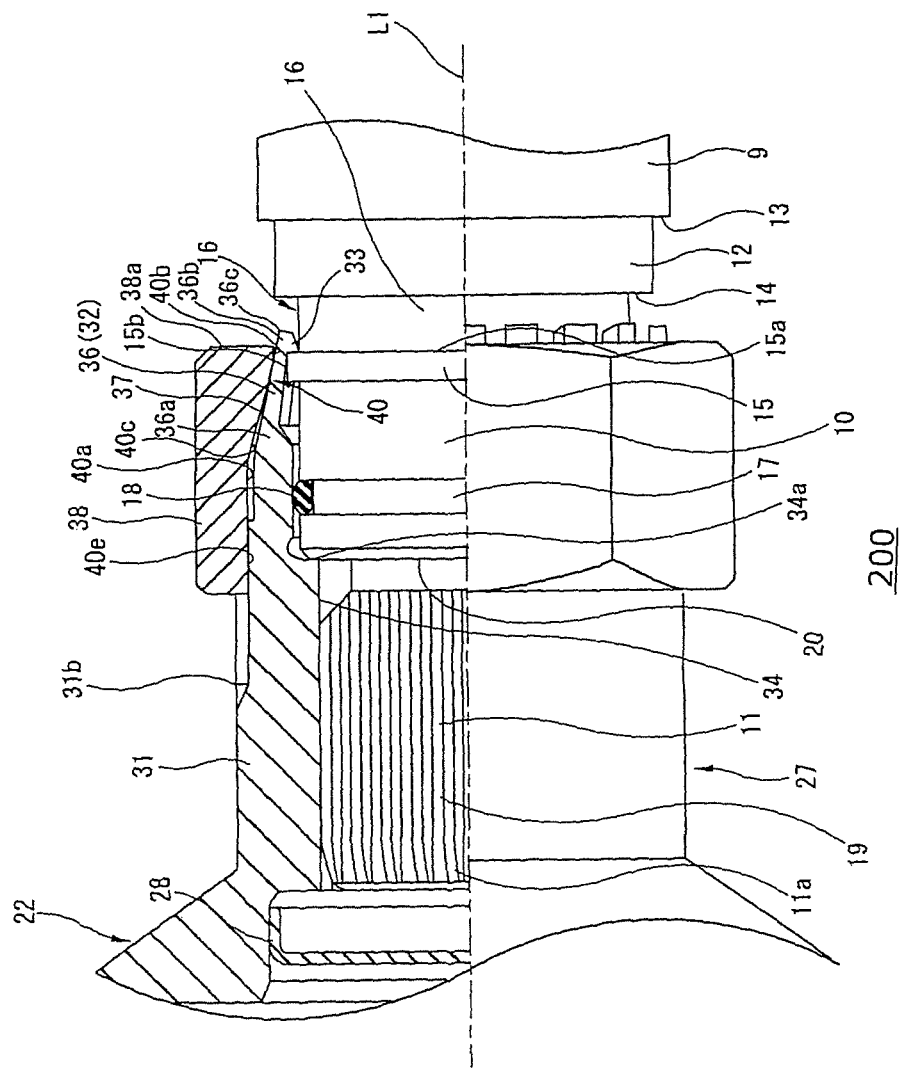
FIG. 8 is a sectional view similar to FIG. 6, but showing a second embodiment of the present invention.

Referring to FIG. 8, there is shown an essential part of a second embodiment 200 of the present invention.

The essential part shown in FIG. 8 corresponds to the coupling construction of the first embodiment 100 as shown in FIG. 6.

As shown, in the second embodiment 200, the circlip 39 employed in the first embodiment 100 is not used, and in place of the press-fitting of the fixing ring member 38 to the smaller diameter portion 27 in the first embodiment, the fixing ring member 38 is screwed to the smaller diameter portion 27.

For simplification of the description, substantially the same elements and parts as those in the first embodiment 100 will be denoted by the same reference numerals and detailed description of such elements and parts will be omitted in the following.

As is seen from FIG. 8, in the second embodiment 200, the cylindrical base portion 31 is formed at an outer cylindrical wall thereof with a male screw portion 31b, and the fixing ring member 38 is formed at an inner cylindrical wall thereof with a female screw portion 40e that is engageable with the male screw portion 31b. Although not shown in the drawing, the fixing ring member 38 has a hexagonal shape to be easily handled by a spanner or the like.

That is, by turning the fixing ring member 38 about the common rotation axis L1, the axial position of the fixing ring member 38 relative to the cylindrical base portion 31 is established as is seen from the drawing. When, due to the turning, the fixing ring member 38 comes to a given axial position as shown, the catching pawls 33 of the cylindrical base portion 31 are brought into engagement with the annular flange portion 15.

In this second embodiment 200, the engagement between the catching pawls 33 and the annular flange portion 15 can be viewed from the outside.

According to the second embodiment 200, substantially the same advantageous effects as those of the first embodiment 100 are obtained. Furthermore, due to a frictional force produced between the male screw portion 31b and the female screw portion 40e, the fixing ring member 38 can be assuredly connected to the smaller diameter portion 27. In this second embodiment 200, the number of parts is reduced and thus the manufacturing cost is reduced.

Third Embodiment

Figure 9:
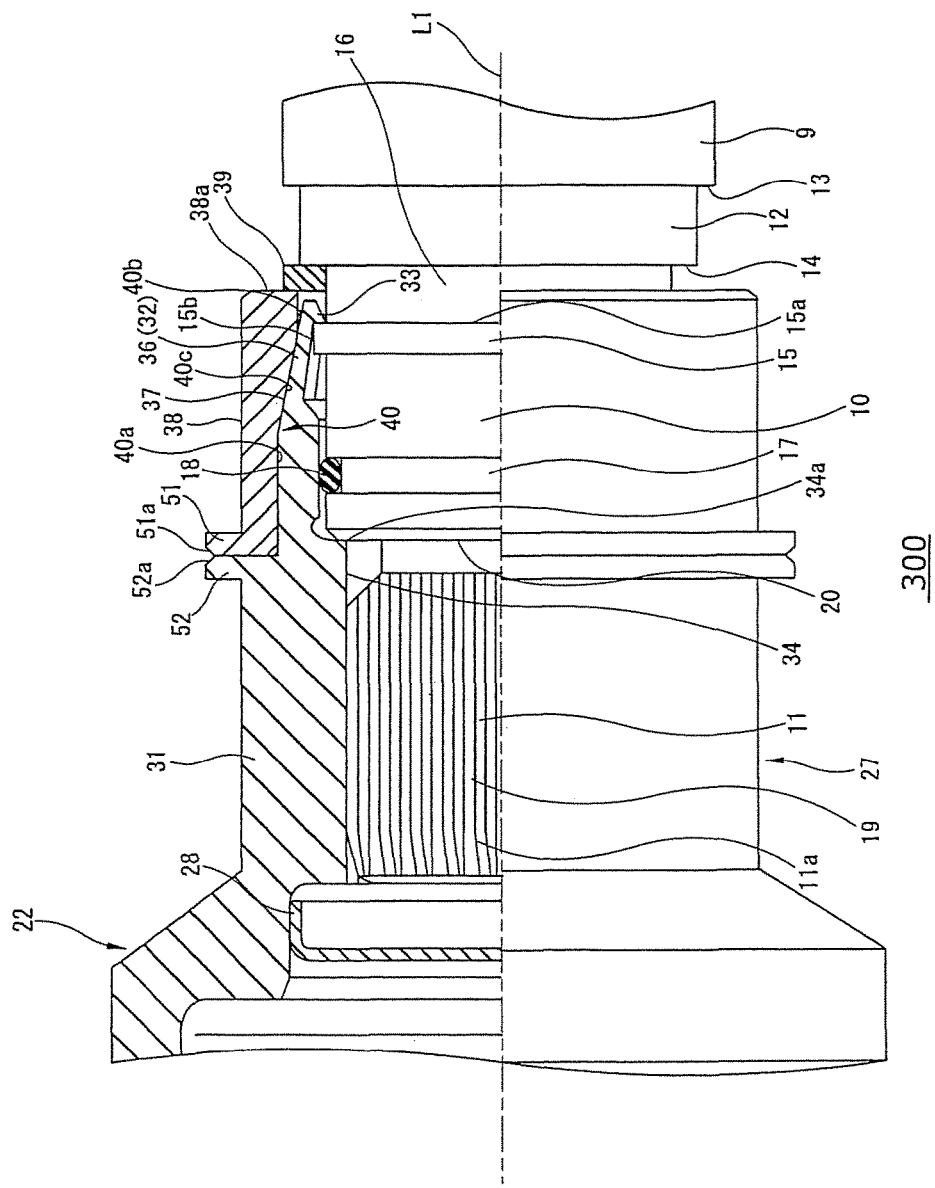
FIG. 9 is a sectional view similar to FIG. 6, but showing a third embodiment of the present invention.
Figure 10:
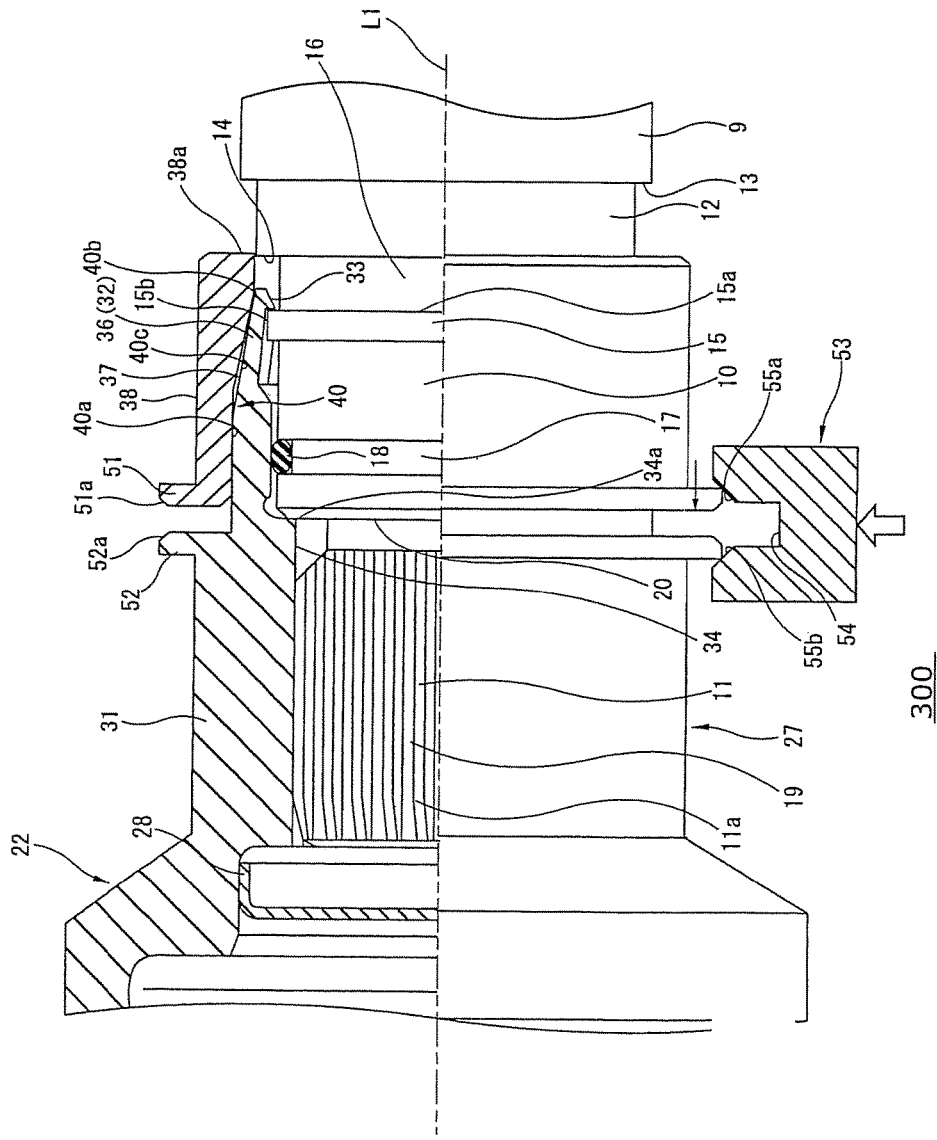
FIG. 10 is a sectional view of the third embodiment similar to FIG. 9, but showing a condition in which a fixing ring member is about to be inserted onto a cylindrical shaft portion.
Figure 11:
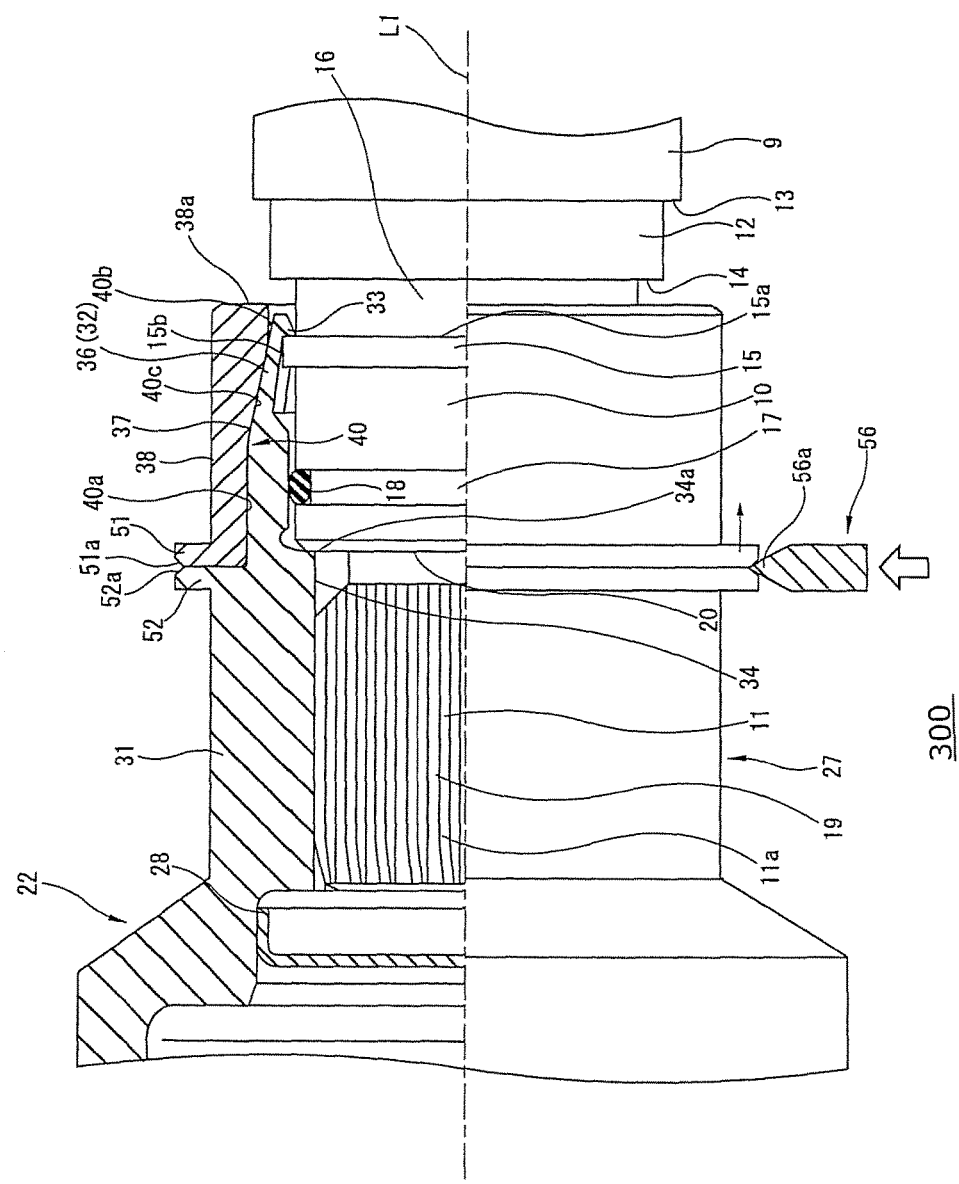
FIG. 11 is a sectional view of the third embodiment similar to FIG. 9, but showing a condition in which the fixing ring member and the cylindrical shaft portion are about to be disengaged from each other.

Referring to FIGS. 9 to 11, there is shown an essential part of a third embodiment 300 of the present invention.

Like in the above-mentioned second embodiment 200, the essential part shown in FIGS. 9 to 11 corresponds to the coupling construction of the first embodiment 100 as shown in FIG. 6.

As shown in FIG. 9, in the third embodiment 300, the fixing ring member 38 and the smaller diameter portion 27 are formed with first and second annular flanges 51 and 52. More specifically, the fixing ring member 38 is formed at its left end with the first annular flange 51, and the smaller diameter portion 27 is formed at a right end of the cylindrical base portion 31 thereof with the second annular flange 52. Each annular flange 51 or 52 has a rectangular cross section as shown.

As is seen from FIG. 10, the first and second annular flanges 51 and 52 are axially movably controlled by a pressing tool 53. That is, when the pressing tool 53 is pressed against the flanges 51 and 52 in a direction indicated by a thick arrow, the fixing ring member 38 is axially moved toward the smaller diameter portion 27. Due to this movement, the fixing ring member 38 is press-fitted to the outer cylindrical surface of the smaller diameter portion 27, as is seen from FIG. 9.

As is seen from FIG. 10, the pressing tool 53 is formed with a rectangular recess 54 that faces the first and second annular flanges 51 and 52. The rectangular recess 54 is formed at its upper end with first and second inclined guide surfaces 55a and 55b by which the first and second annular flanges 51 and 52 are guided to move toward each other when the pressing tool 53 is pressed against the flanges 51 and 52 in the direction indicated by the thick arrow.

As is seen from FIG. 11, the first and second annular flanges 51 and 52 are formed at mutually facing outer portions thereof with annular sloped recesses 51a and 52a respectively. Thus, when, with the two flanges 51 and 52 being closely placed in a back to back relationship, a separating tool 56 is pressed against the two flanges 51 and 52 having its tip 56a put in the combined annular sloped recesses 51a and 52a, the fixing ring member 38 is easily separated from the smaller diameter portion 27.

Fourth Embodiment

Figure 12:
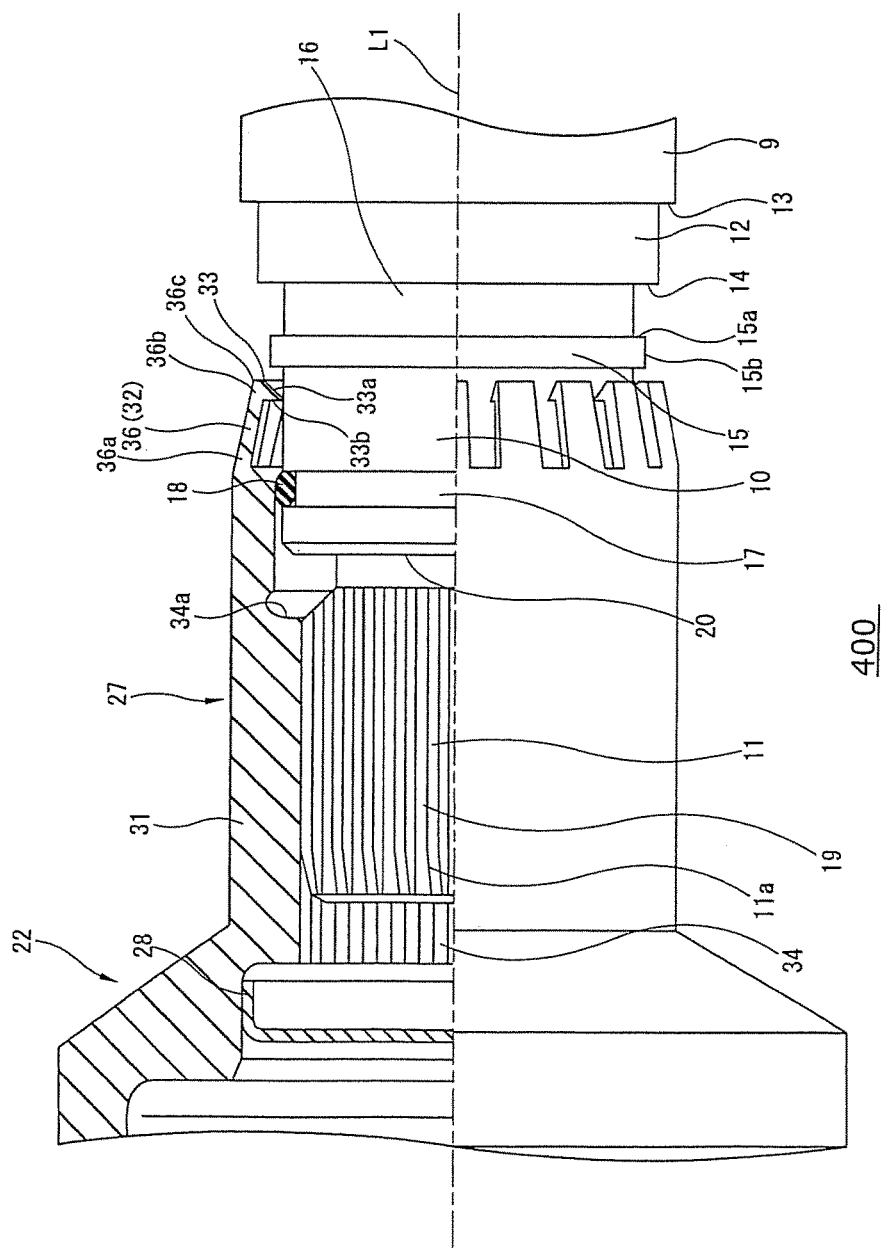
FIG. 12 is a sectional view of a fourth embodiment in a condition in which the output shaft is slightly inserted into the second constant velocity universal joint.
Figure 13:
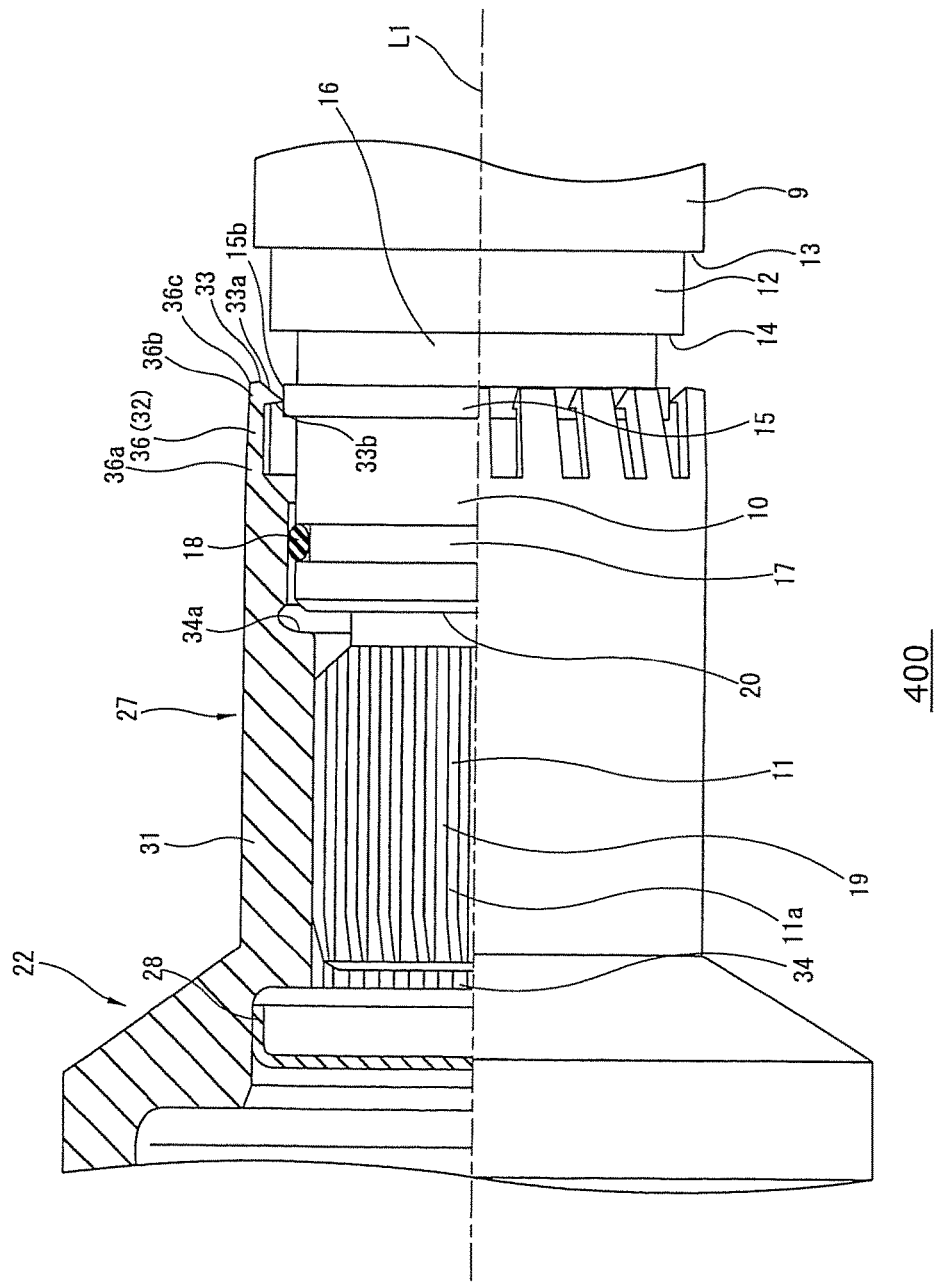
FIG. 13 is a sectional view of the fourth embodiment, but showing a condition in which the output shaft is further inserted into the second constant velocity universal joint.
Figure 14:
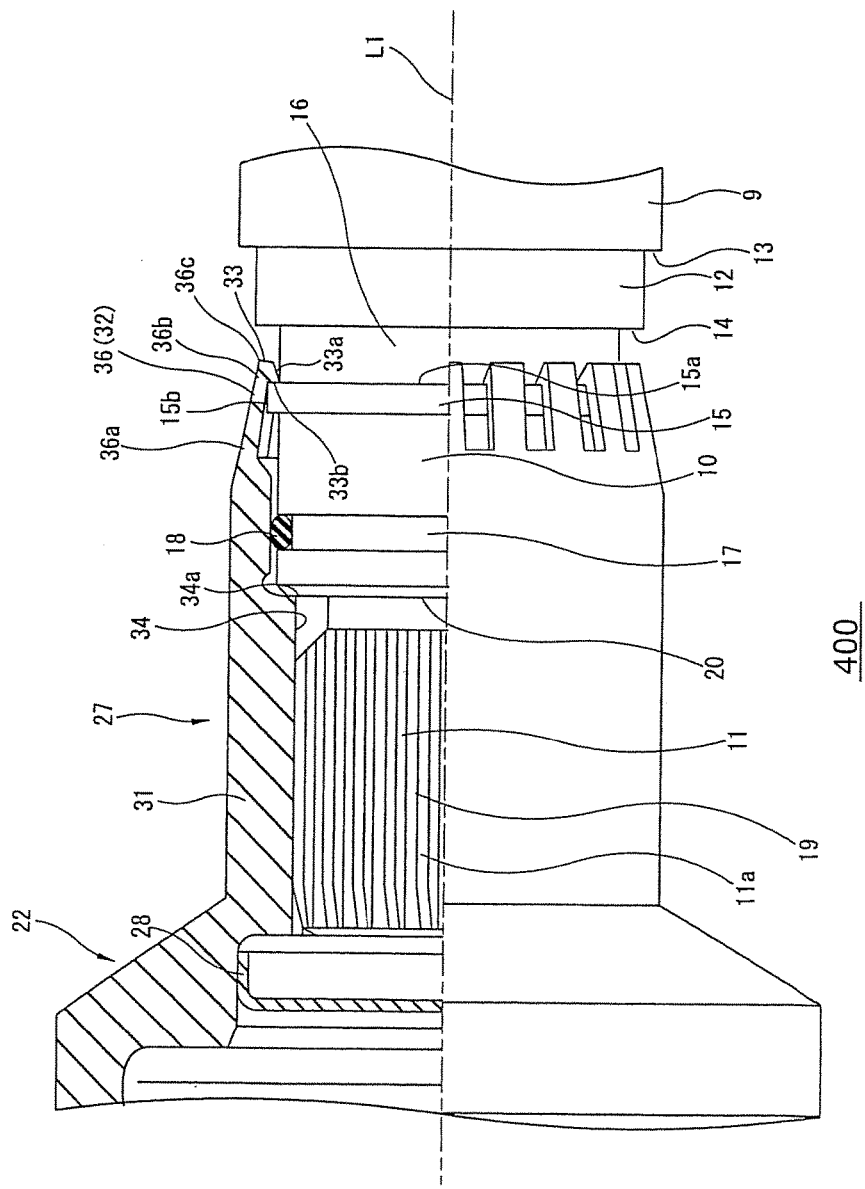
FIG. 14 is a sectional view of the fourth embodiment, but showing a condition in which the output shaft is deeply inserted into the second constant velocity universal joint.

Referring to FIGS. 12 to 14, there is shown an essential part of a fourth embodiment 400 of the present invention.

Like in the above-mentioned second embodiment 200, the essential part shown in FIGS. 12 to 14 corresponds the coupling construction of the first embodiment 100 as shown in FIG. 6.

As shown in FIG. 12, in the fourth embodiment 400, the fixing ring member 38 and the circlip 39 that are employed in the first embodiment 100 are not used.

In the fourth embodiment 400, the flat flexible part 36 of each flexible arm 32 is bent radially inward, and the inclined surface 33a of each catching pawl 33 is shaped to be engageable with the annular flange portion 15 in an axial direction.

As will be understood from FIG. 12, when the left end of the output shaft 2 is inserted into the smaller diameter portion 27 by a given degree, the inclined surfaces 33a of the catching pawls 33 of the flexible arms 32 are brought into abutment with the annular flange portion 15. When thereafter the left end of the output shaft 2 is further inserted into the smaller diameter portion 27, the catching pawls 33 are forced to ride on the outer cylindrical wall 15b of the annular flange portion 15 due to a sliding up movement of the inclined surfaces 33a over the front edge of the outer cylindrical wall 15b, as will be understood from FIG. 13. When then the left end of the output shaft 2 is further inserted into the smaller diameter portion 27, the catching pawls 33 are disengaged from the outer cylindrical wall 15b and flexed radially inward to engage with the annular flange portion 15, as shown in FIG. 14. It is to be noted that the radially inward flexion of the catching pawls 33 is induced by an elastic force that is stored in the flexible arms 32 when the catching pawls 33 are pushed onto the outer cylindrical wall 15b. Upon this, the output shaft 2 is properly coupled with the smaller diameter portion 27.

In this fourth embodiment 400, the coupling between the output shaft 2 and the smaller diameter portion 27 is easily achieved by only inserting the left end of the output shaft 2 into the smaller diameter portion 27. For facilitating the riding of the catching pawls 33 onto the outer cylindrical wall 15b of the annular flange portion 15, a desired inclination angle of each inclined surface 33a relative to the common rotation angle L1 is obtained by carrying out various performing tests.

In the following, modifications of the present invention will be described.

In the above, the description is directed to a structure in which the flexible arms 32 and the cylindrical base portion 31 are constructed as an integral one-piece unit. However, if desired, the flexible arms 32 and the cylindrical base portion 31 may be produced from separate parts.

In the above-mentioned first to third embodiments 100, 200 and 300, both the smaller diameter portion 27 and the fixing ring member 38 are formed with the tapered surface 37 and the tapered middle portion 40c respectively. However, if the forward sliding of the fixing ring member 38 over the smaller diameter portion 27 can be smoothly made while producing the wedge effect, one of the smaller diameter portion 27 and the fixing ring member 38 may remove the tapered surface 37 or tapered middle portion 40c.

In the following, merits and/or advantages obtained or expected from respective features will be described.

According to the features of at least one embodiment, due to usage of the shrinkage and expansion of the elastically shrinkable cylindrical portion, the catching pawls can be brought into latching engagement with the annular stepped part for achieving the coupling of the engaged portion with the engaging portion. Thus, the coupling between the engaged portion and the engaging portion is easily carried out.

According to the features of at least one embodiment, the latched engagement between the engaged portion and the engaging portion can be easily released.

According to the features of at least one embodiment, the clearance between the second shaft and the cylindrical base portion is effectively sealed. Furthermore, since the annular seal member is provided to the cylindrical base portion, not to the elastically shrinkable cylindrical portion, the annular seal member is not affected by a deformation of the elastically shrinkable cylindrical portion.

According to the features of at least one embodiment, the flexibility of the elastically shrinkable cylindrical portion is increased. Furthermore, since the rigidity of the elastically shrinkable cylindrical portion is lowered, the rigidity of the cylindrical base portion is increased. Thus, the annular seal member mounted to the cylindrical base portion is not affected by the deformation of the elastically shrinkable cylindrical portion.

According to the features of at least one embodiment, the flexibility of the elastically shrinkable cylindrical portion is more increased.

According to the features of at least one embodiment, due to reduction in thickness of the elastically shrinkable cylindrical portion, the flexibility of the portion is much increased.

According to the features of at least one embodiment, since the annular seal member and the elastically shrinkable cylindrical portion are spaced from each other, the annular seal member is not affected by the deformation of the elastically shrinkable cylindrical portion.

According to the features of at least one embodiment, the side of the catching pawls becomes more flexible and the side of the cylindrical base portion becomes more rigid. Thus, obtaining flexibility and rigidity at desired portions is achieved at the same time. Furthermore, since the thickness of the elastically shrinkable cylindrical portion is gradually varied, undesired concentration of the internal stress can be avoided.

In addition, according to the features of at least one embodiment, the engagement between the catching pawls and the annular stepped portion is assuredly held.

According to the features of at least one embodiment, since the elastically shrinkable cylindrical portion can be deformed by only moving the fixing ring member in the axial direction, the fixing work is easy.

According to the features of at least one embodiment, the catching pawls can be brought into contact with the fixing ring member prior to the contact of elastically shrinkable cylindrical portion with the fixing ring member. Thus, engagement of the catching pawls with the annular stepped portion is assuredly made.

According to the features of at least one embodiment, disengagement of the fixing ring member from its locked position is assuredly prevented.

According to the features of at least one embodiment, due to usage of the circlip, the work for locking the fixing ring member to the engaging portion is easy.

According to the features of at least one embodiment, a relative inclination between the fixing ring member and the engaging portion can be absorbed by the given annular clearance. Furthermore, the engagement between the fixing ring member and the engaging portion can be assuredly made by the locking member.

According to the features of at least one embodiment, proper setting of the circlip into the given clearance can prove that the catching pawls are properly and assuredly engaged with the annular flange portion.

According to the features of at least one embodiment, the fixing ring member can be assuredly connected to the engaging portion due to the frictional force produced by the male-female screw engagement.

According to the features of at least one embodiment, a state in which the catching pawls are engaged with the annular stepped part can be easily recognized.

According to the features of at least one embodiment, due to usage of the tool, the fixing ring member can be easily fitted to the engaging portion.

According to the features of at least one embodiment, due to the unique shape of the annular sloped recess, the fixing ring member and the engaging portion can be easily dismantled from each other by only inserting a given tool into the annular sloped recess.

According to the features of at least one embodiment, the catching pawls can be easily and assuredly engaged with the annular stepped part.

According to the features of at least one embodiment, finding an axial clearance between the catching pawls and the annular stepped part proves that the two serrations have been assuredly engaged.

The entire contents of Japanese Patent Application 2016-136506 filed Jul. 11, 2016 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A power transmission shaft interposed between first and second shaft members that make up a pair of vehicle side shaft members, the first shaft member being arranged to be driven by a power source and the second shaft member being arranged to drive road wheels, so that a power of the power source is transmitted to the road wheels through the power transmission shaft, the power transmission shaft comprising:
   at least one shaft interposed between the first shaft member and the second shaft member;
   an engaged portion that is provided on one axial end of one of the paired vehicle side shaft members and has an annular stepped part formed between a smaller diameter portion with a is first diameter and a larger diameter portion with a second diameter larger than the first diameter, each of the smaller and larger diameter portions being arranged to extend around a common rotation axis;
   an engaging portion that is provided on one axial end of the at least one shaft, wherein the engaging portion comprises a cylindrical base portion that rotates together with the shaft unit, an elastically shrinkable cylindrical portion that is provided by the cylindrical base portion at a position opposite to the shaft unit, and a projected portion that is provided by the elastically shrinkable cylindrical portion; and
   a fixing ring that is connectable to the engaging portion such that the projected portion is latchingly engaged with the annular stepped part when the elastically shrinkable cylindrical portion is subjected to shrink and/or expansion.

2. A power transmission shaft as claimed in claim 1, in which the elastically shrinkable cylindrical portion is made of an elastic material and shrinkable and expandable within an elastic limit.

3. A power transmission shaft as claimed in claim 1, further comprising an annular seal member that is provided between the second shaft member and the cylindrical base portion to seal a circular clearance defined therebetween.

4. A power transmission shaft as claimed in claim 3, in which the elastically shrinkable cylindrical portion is formed with a slit portion that extends in the direction of the common rotation axis.

5. A power transmission shaft as claimed in claim 4, in which the slit portion comprises a plurality of slits that are circumferentially arranged about the common rotation axis.

6. A power transmission shaft as claimed in claim 3, in which a thickness in radial direction of the elastically shrinkable cylindrical portion is smaller than that of the cylindrical base portion.

7. A power transmission shaft as claimed in claim 6, in which the annular seal member is axially spaced apart from the elastically shrinkable cylindrical portion by a given distance.

8. A power transmission shaft as claimed in claim 6, in which the elastically shrinkable cylindrical portion is formed with a tapered portion whose thickness in radial direction gradually increases in the direction from the projected portion toward the cylindrical base portion.

9. A power transmission shaft as claimed in claim 1, in which at least one of the elastically shrinkable cylindrical portion or the fixing ring is formed with a tapered portion whose radial dimension gradually changes in the direction of the common rotation axis, and in which when the fixing ring slides on the cylindrical base portion, the elastically shrinkable cylindrical portion is subjected to shrink and/or expansion due to a wedge effect produced by the tapered portion.

10. A power transmission shaft as claimed in claim 9, in which the tapered portion is provided to both the elastically shrinkable cylindrical portion and the fixing ring, in which the fixing ring is arranged to exhibit the wedge effect when moving in the direction from the projected portion to the cylindrical base portion, and in which an angle of the tapered portion of the fixing ring relative to the common rotation axis is greater than an angle of the tapered portion of the elastically shrinkable cylindrical portion relative to the common rotation axis.

11. A power transmission shaft as claimed in claim 1, further comprising a lock that is positionable between the engaging portion and the fixing ring to lock the fixing ring to the engaging portion.

12. A power transmission shaft as claimed in claim 11, in which the lock is a circlip.

13. A power transmission shaft as claimed in claim 12, in which the fixing ring is cylindrical and covers the engaging portion with a given annular clearance therebetween.

14. A power transmission shaft as claimed in claim 12, in which the circlip is properly set between the engaging portion and the fixing ring only when the projected portion is latchingly engaged with the annular stepped part.

15. A power transmission shaft as claimed in claim 1, in which the engaging portion is formed at an outer cylindrical wall thereof with a male screw portion and the fixing ring is formed at an inner cylindrical wall thereof with a female screw portion, so that when the male screw portion and the female screw portion are engaged, the fixing ring is fixed to the engaging portion.

16. A power transmission shaft as claimed in claim 15, in which the projected portion is arranged to be viewed from outside when the fixing ring is fixed to the engaging portion.

17. A power transmission shaft as claimed in claim 1, in which the fixing ring is formed with a first annular flange and the engaging portion is formed with a second annular flange, so that when the first and second annular flanges are combined by a given tool, the fixing ring is fitted to the engaging portion.

18. A power transmission shaft as claimed in claim 17, in which at least one of the first or second annular flanges is formed with an annular sloped recess whose diameter gradually increases as the slope of the annular sloped recess is shifted radially outward.

19. A power transmission shaft as claimed in claim 1, in which the projected portion is shaped to project radially inward toward the common rotation axis, in which the projected portion is formed with an inclined surface that is contactable with the annular stepped part, and in which a radial distance between the common rotation axis and the inclined surface gradually increases as an axial distance between the inclined surface and the annular stepped part reduces.

20. A power transmission shaft as claimed in claim 1, in which the second shaft member is formed at its cylindrical outer surface with a male serration and the cylindrical base portion is formed at its cylindrical inner surface with a female serration that is engageable with the male serration, and in which when the male serration is inserted into the female serration by such a degree as to establish the deepest engagement therebetween, the projected portion is placed apart from the annular stepped part in the direction of the common rotation axis.

* * * * *